E. R. ARNDT.
TRACTOR BELT.
APPLICATION FILED MAY 1, 1919.

1,358,494.

Patented Nov. 9, 1920.
3 SHEETS—SHEET 1.

INVENTOR
Earnest R. Arndt
BY Baldwin Vale
ATTORNEY

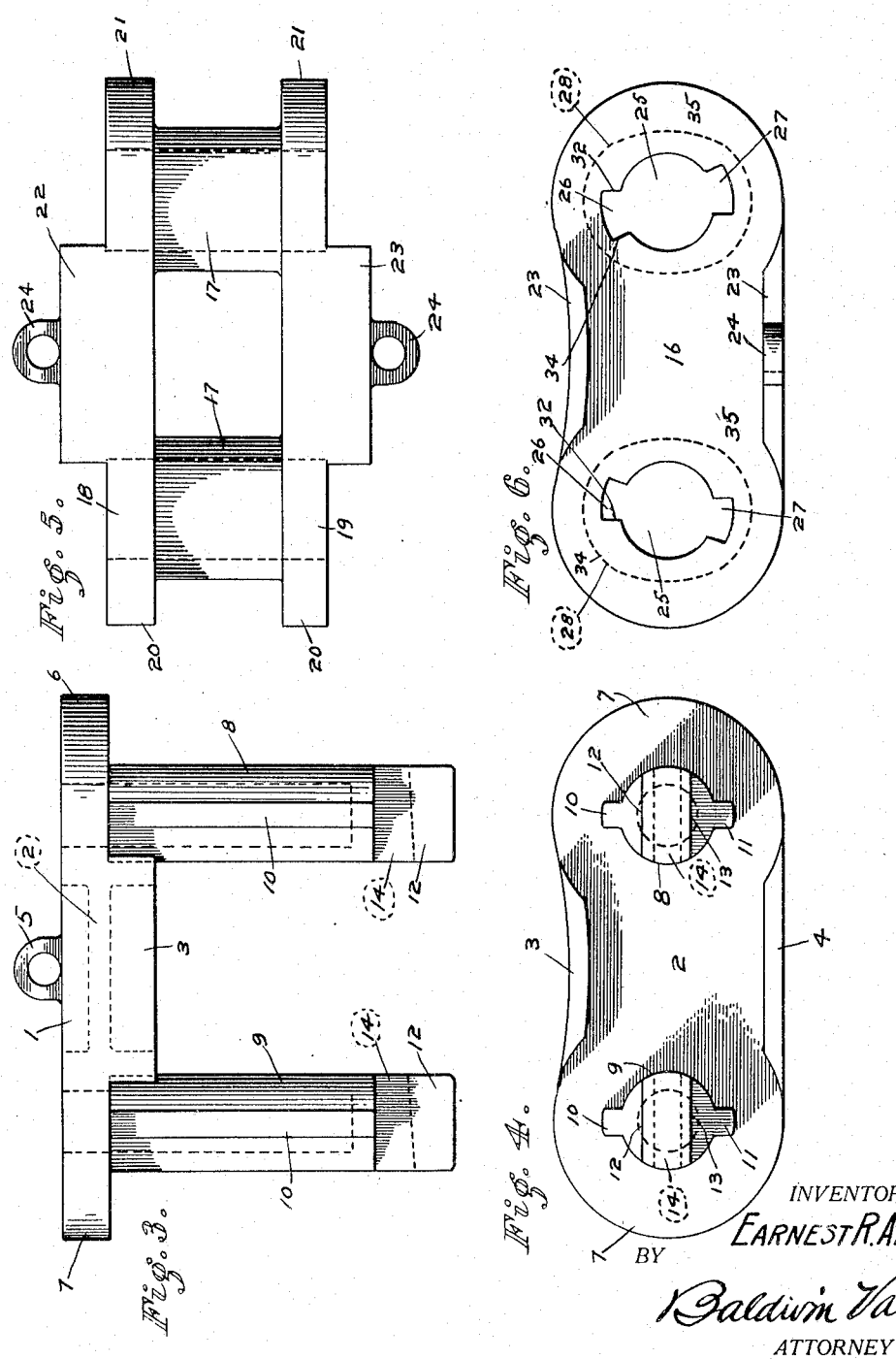

E. R. ARNDT.
TRACTOR BELT.
APPLICATION FILED MAY 1, 1919.
1,358,494.
Patented Nov. 9, 1920.
3 SHEETS—SHEET 3.
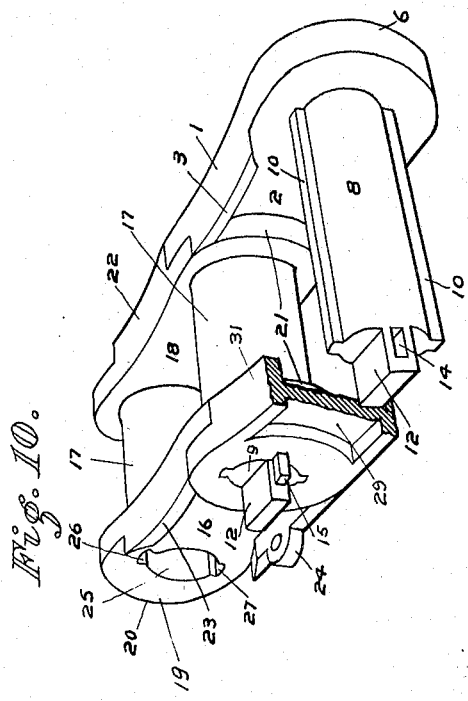
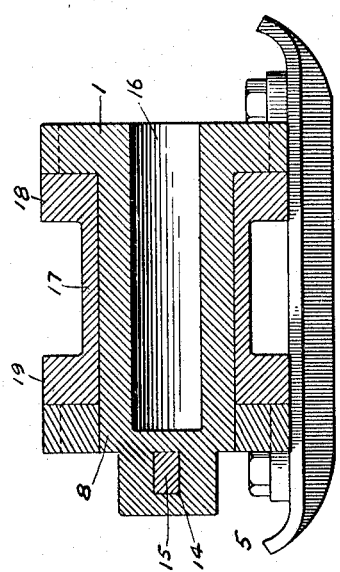
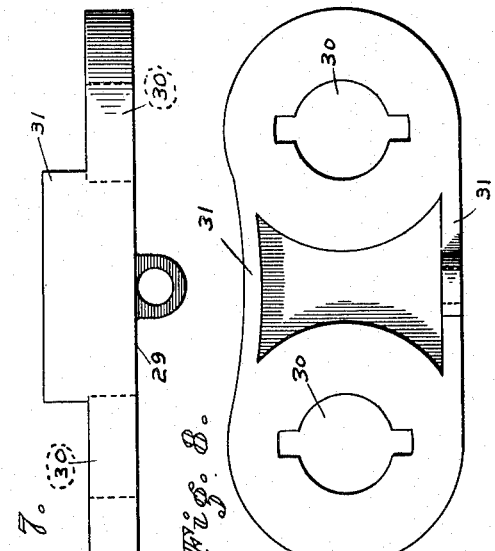
INVENTOR
*Earnest R. Arndt*
BY
*Baldwin Vale*
ATTORNEY

UNITED STATES PATENT OFFICE.

EARNEST R. ARNDT, OF SAN FRANCISCO, CALIFORNIA.

TRACTOR-BELT.

1,358,494.　　　Specification of Letters Patent.　　Patented Nov. 9, 1920.

Application filed May 1, 1919. Serial No. 293,956.

*To all whom it may concern:*

Be it known that I, EARNEST R. ARNDT, a citizen of the United States, and a resident of the city and county of San Francisco, State of California, have made a new and useful Invention—to wit, Improvement in Tractor-Belts; and I do hereby declare the following to be a full, clear, concise, and exact description of the same.

This invention relates to a new, novel, useful and ingenious arrangement of links adapted to be fastened together to form a traction belt commonly used in traction engines of the self-laying track type.

One of the objects of the invention is to form a link mechanism which will bend freely in one direction, but will not bend in the opposite direction, thus forming an arch when passing over the top of an endless belt mechanism, and will thus be self-supporting, eliminating all idlers commonly used in structures of this character.

Another object of the invention is to produce a link which may be built up in multiples to form any length of belt and one which may be cast of manganese steel or like material and assembled without mechanical finishing.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the drawings,

Figure 1 discloses the side view of a tractor belt and

Fig. 2 a top plan view thereof.

Fig. 3 is a plan view of one of my connector link sections.

Fig. 4 is a side view thereof.

Fig. 5 is a link which is interposed between connector links of the character shown in Fig. 3.

Fig. 6 is a side elevation of Fig. 5.

Fig. 7 is a top plan view of a connecting link shown in elevation, and

Fig. 8 is a side elevation thereof.

Fig. 9 is a section on the line 9—9 of Fig. 1.

Fig. 10 is a perspective view of one of my link sections.

Figure 1:
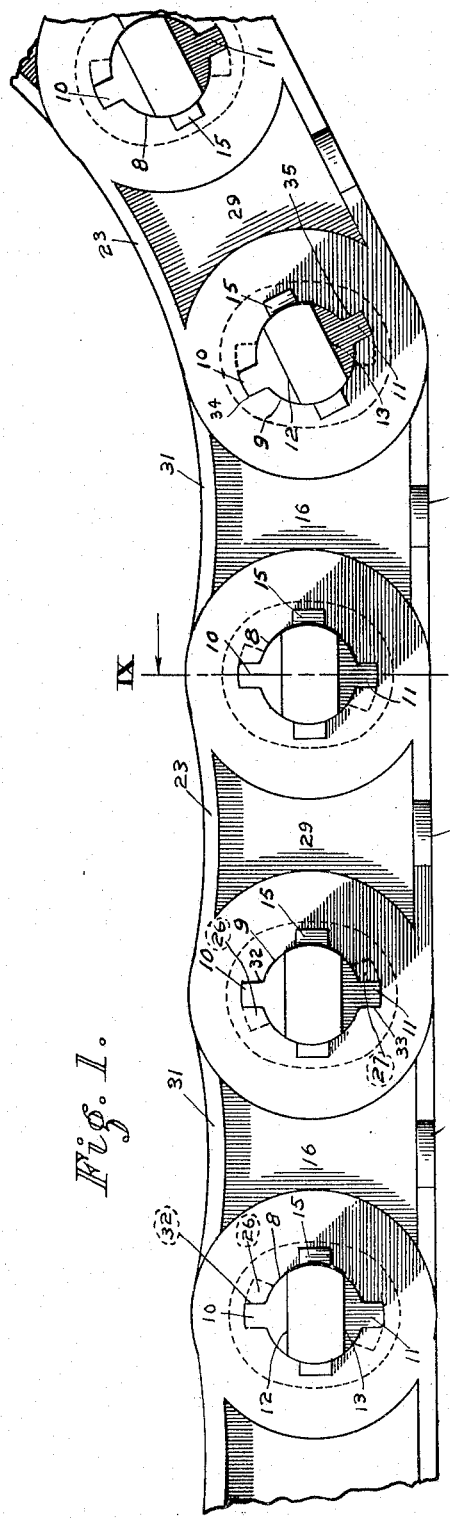
Figure 2:
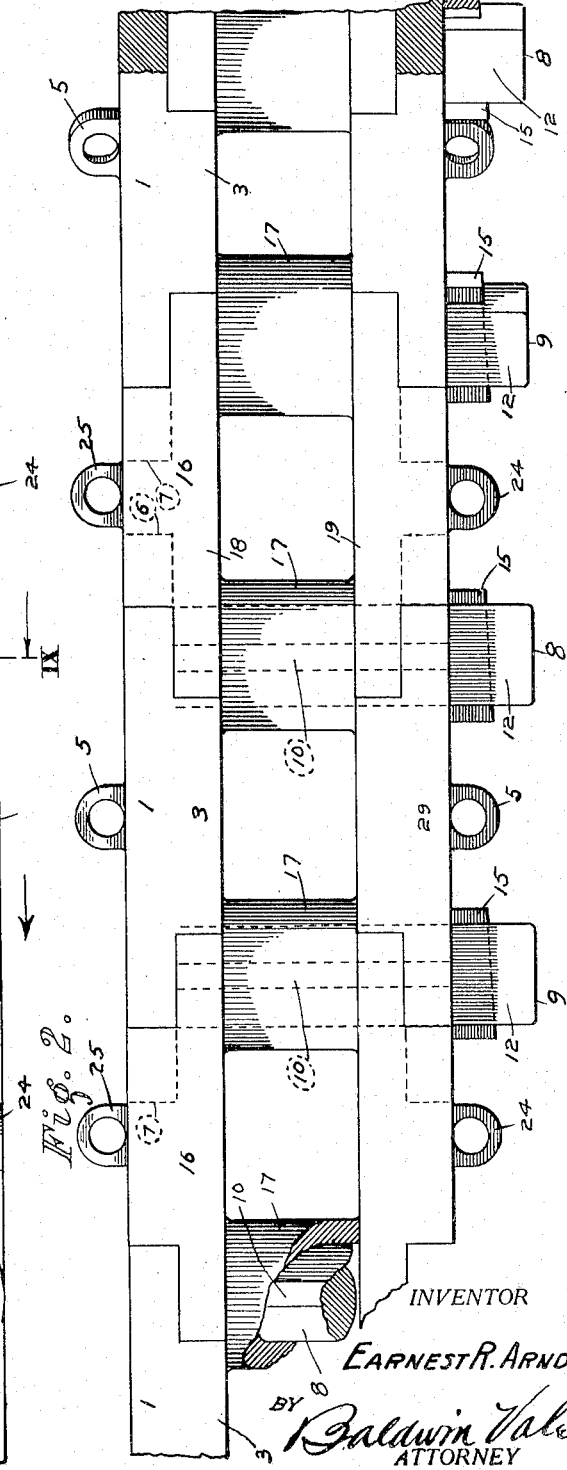

In the drawings, the numeral 1 designates the side plate of a connector link. This side plate is provided with a web 2 and flanges 3 and 4, which extend inwardly and serve to strengthen the link structure. The numeral 5 represents a lug to which grousers are attached. These connector links have circular ends 6 and 7. Gudgeon pins 8 and 9 are formed integral with the side plate 1 and are in parallel alinement with each other. These gudgeon pins are located concentric with the axis of the ends 6 and 7. These pins are circular in cross section, and have formed upon their upper and lower surfaces lugs 10 and 11, which lugs extend substantially the whole length of the pin.

The outer ends of these pins are cut away, as shown at 12 and 13. An opening 14 is provided through each pin to receive a wedge member 15 which is placed in the openings 14 after the belt has been assembled.

The numeral 16 refers to a link as a whole, which link is adapted to coöperate with the connector link just described in assembling and forming a part of a completed chain. This link is composed of an integral casting having two tubular members 17 in parallel alinement between the plates 18 and 19. These plates have circular ends 20 and 21 struck from the center of the tubular members 17. Strengthening flanges 22 and 23 extend outwardly from said side members 18 and 19, and the lower flanges carry lugs 24 similar to those designated by the numeral 5. The tubular members 17 are centrally bored, as shown at 25, and have slots 26 and 27 in the upper and lower part of the bore.

It will be noted in Fig. 6 that the tubular members are elliptical, see dotted line 28.

In assembling my device, one of the links 16 is placed upon the link 1, so that the gudgeon pin 8 passes through one tubular member 17 and the lug 10 will lie within the groove 26, and the lug 11 will lie within the groove 27. A second member 16 is placed upon the gudgeon pin 9 with its lugs 10 and 11 lying within the grooves 26 and 27 of the second link. A side plate 29 is provided having orifices 30 therein, of the same contour as the gudgeon pins, and strengthening flanges 31 upon one side near the top and bottom of said plate. These flanges correspond to the flanges 3 and 4 of the connector link member. This plate 29 is passed over the ends of the gudgeon members 8 and 9, and serves to hold the link members 16 upon the connector and also acts as a connector for the ends of the gudgeon pins 8 and 9. This side plate 29 is held in position by wedge members 15. When traveling along a level surface, the lugs 10 of the connector links within the grooves 26 of the preceding links contact with the rear faces 32 of said grooves and the forward face of the lugs 11 contacts with the forward faces of the grooves 27, as shown at 33. When the belt passes upwardly over a sprocket wheel, the belt is free to bend until the lugs 10 and 11 contact with the points 34 and 35 of said grooves 26 and 27.

As soon as the belt starts to leave the sprocket, the links move into a substantially horizontal position similar to that shown in Fig. 1 were it turned upside down. It will thus be seen that no sag can result, and consequently the links must pass from one sprocket to the next in a straight line and without the necessity of supports. Any tendency to sag is stopped by the action of the links contacting with the sides of the grooves.

Having thus described my invention, what I claim as new and desire to secure by Letters Patent is:

1. In a device of the character described, the combination of links, connectors adapted to coöperate with said links, pins carried by said connectors, lugs carried by said pins and adapted to limit the movement of said links on said pins.

2. In a belt, the combination of links having tubular members, connectors adapted to coöperate with said links, pins carried by said connectors, lugs carried by said pins and adapted to limit the movement of said links in relation to said pins.

3. In a belt, the combination of links having tubular portions, grooves within said tubular portions, connectors adapted to coöperate with said links, pins carried by said connectors, lugs carried by said pins and adapted to fit within said tubular members and said slots, and to limit the movement of said links in connection with said connectors.

In testimony whereof I have hereunto set my hand at San Francisco, California, this 31st day of March, 1919.

EARNEST R. ARNDT.

In presence of—
A. J. HENRY.